(12) United States Patent
Aghssa et al.

(10) Patent No.: US 6,830,287 B1
(45) Date of Patent: Dec. 14, 2004

(54) REAR RAIL NEUTRALIZING MEMBER

(75) Inventors: Peyman Aghssa, Ann Arbor, MI (US); John Jude Fusco, White Lake, MI (US); William Moore Sherwood, Royal Oak, MI (US); Martin Wedel, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/604,480

(22) Filed: Jul. 24, 2003

(51) Int. Cl.[7] ............................................. B62D 25/08
(52) U.S. Cl. .................... 296/187.11; 296/204; 296/30; 280/784
(58) Field of Search ...................... 296/187.11, 193.08, 296/203.04, 204, 30; 280/784

(56) References Cited

U.S. PATENT DOCUMENTS

| | | | |
|---|---|---|---|
| 3,883,166 A | 5/1975 | Cadious | |
| 4,428,599 A | 1/1984 | Jahnie | |
| 4,673,205 A | 6/1987 | Drewek | |
| 4,708,391 A | 11/1987 | Nakano | |
| 5,180,206 A | 1/1993 | Toyoda | |
| 5,228,741 A | 7/1993 | Ide | |
| 5,381,871 A | * 1/1995 | Ohta | 180/296 |
| 6,053,566 A | 4/2000 | Aghssa et al. | |
| 6,099,039 A | 8/2000 | Hine | |
| 6,120,060 A | 9/2000 | Kocer et al. | |
| 6,349,953 B1 | * 2/2002 | Yoshihira et al. | 280/124.109 |
| 6,357,769 B1 | 3/2002 | Omundson | |
| 6,648,401 B2 | * 11/2003 | Behnke et al. | 296/198 |

* cited by examiner

*Primary Examiner*—Dennis H. Pedder
(74) *Attorney, Agent, or Firm*—Gigette M. Bejin

(57) ABSTRACT

The present invention provides a rear impact absorption system for a motor vehicle. The rear impact absorption system includes a rear body assembly including longitudinally extending rear rails including first and second portions having first and second respective heights relative to a generally horizontal plane, the first height being greater than the second height. The invention further provides a neutralizing member connectable to bridge the first and second heights of each rear rail so as to minimize the effect of a moment arm created by the first and second heights during a rear impact.

15 Claims, 5 Drawing Sheets

REAR RAIL NEUTRALIZING MEMBER

BACKGROUND OF INVENTION a. Field of Invention

The invention relates generally to a rear body design for a vehicle, and, more particularly to rear rail neutralizing member for minimizing the effect of a moment arm created by the offset of the upper and lower rear rail centroids during rear impact.

b. Description of Related Art

The rear body for a vehicle generally includes a floorpan, rails, body panels, a rear suspension system and a fuel system. On some vehicles, the rear body may include a spare tire, a pivotable door and/or a door track for a sliding door. The rear body also generally includes a rear bumper system at a rear end thereof.

During a rear impact, the rear bumper system and the rails, floorpan and body panels of the rear body are designed to absorb the majority of the impact. While the rear bumper system absorbs a portion of the impact energy in a rear impact, the remaining energy is distributed and absorbed by the rear body. Thus, the design of the rear body plays an important role in the absorption and distribution of forces generated during a rear impact.

In sedan and wagon uni-body vehicles including an all-wheel drive (AWD) option and low step-over height for customer ease of ingress and egress, these rear impact absorption characteristics require the large rear rail system offset to be taken into account in the design of the rear body. This is because in such vehicles, the moment arm created by the two height levels of the rear rail system forward and aft sections is greater than that for wagon uni-body vehicles or typical sedans without the AWD option.

Commonly owned U.S. Pat. No. 6,053,566, which is incorporated herein in its entirety by reference, describes a rear body assembly for motor vehicles including rear rails having a plurality of convolutions for absorbing energy upon a rear impact.

While many advances have been made in rear rail systems for improved rear impact absorption characteristics, as evidenced by the rear body assembly described in U.S. Pat. No. 6,053,566, there remains a need for a system or method for minimizing the moment arm created by the two height levels of the rear rail system forward and aft sections for sedans or other vehicles including an AWD option and/or similar rear impact absorption requirements. Specifically, there remains a need for a system or method for minimizing and/or controlling deformation of a vehicle rear body, which is robust in design, simple to install and service, and which is economically feasible to manufacture.

SUMMARY OF INVENTION

The invention solves the problems and overcomes the drawbacks and deficiencies of prior art rear rail systems by providing a rear rail neutralizing member for minimizing the effect of the offset between rear rail upper and lower centroids.

Thus an exemplary aspect of the present invention is to provide a rear rail neutralizing member for minimizing the effect of a moment arm created by rear rail upper and lower centroids during a rear impact.

Another aspect of the present invention is to provide a rear rail neutralizing member for minimizing and/or controlling deformation of a vehicle rear body, which is robust in design, simple to install and service, and which is economically feasible to manufacture.

The invention achieves the aforementioned exemplary aspects by providing a rear impact absorption system for a motor vehicle. The system includes a rear body assembly including at least one longitudinally extending rear rail including first and second portions having first and second respective heights relative to a generally horizontal plane, the first height being greater than the second height. The system further includes a neutralizing member operatively connectable to the rear rail to bridge the first and second heights of the rear rail so as to minimize the effect of a moment arm created by the first and second heights during a rear impact.

For the system described above, the neutralizing member may include first and second sections, each including a pair of laterally extending flanges disposed generally orthogonal to the respective first and second sections. Each of the flanges may face an inner surface of the neutralizing member. The first section may be connected to the second section and disposed generally orthogonal to the second section at the connection so as to provide a predetermined distribution of impact energy during a rear impact.

The invention further provides a neutralizing member including first and second sections each including a pair of laterally extending flanges disposed generally transverse to the respective first and second sections. Each of the flanges may face an inner surface of the neutralizing member. The first section may be connected to the second section and disposed generally transverse to the second section at the connection so as to provide a predetermined distribution of impact energy during a rear impact.

For the neutralizing member described above, the second section may include a curved convex member generally centrally disposed along a longitudinal first length of the second section and a curved concave channel generally centrally disposed along a longitudinal second length of the second section. The combined first and second lengths may be less than a total length of the second section. The convex member and the concave channel may provide a predetermined distribution of impact energy during a rear impact. The curved convex member may merge with the curved concave channel. The second section may include a pair of additional laterally disposed flanges oriented vertically or horizontally for facilitating alignment of the neutralizing member relative to the rear rail.

In another aspect, the invention yet further provides a neutralizing member connectable to a rear body assembly of a motor vehicle so as to minimize the effect of a moment arm created by the offset of first and second heights of respective first and second portions of a rear rail during a rear impact. The neutralizing member may include the components and configuration discussed above, and described in further detail below.

The invention also provides a method for minimizing the effect of a moment arm created by the offset of first and second heights of first and second portions of a rear rail during a rear impact on a motor vehicle. The method includes the step of providing a neutralizing member connectable to the rear rail to bridge the first and second heights of the rear rail. The neutralizing member may include first and second sections each including a pair of laterally extending flanges disposed generally transverse to the respective first and second sections, each of the flanges facing an inner surface of the neutralizing member. The first section may be connected to the second section and disposed generally transverse to the second section at the connection so as to provide a predetermined distribution of impact energy during a rear impact. The method further includes the step of installing the neutralizing member into the rear rail.

For the method described above, the neutralizing member may include the components and configuration discussed above, and described in further detail below.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Figure 1:
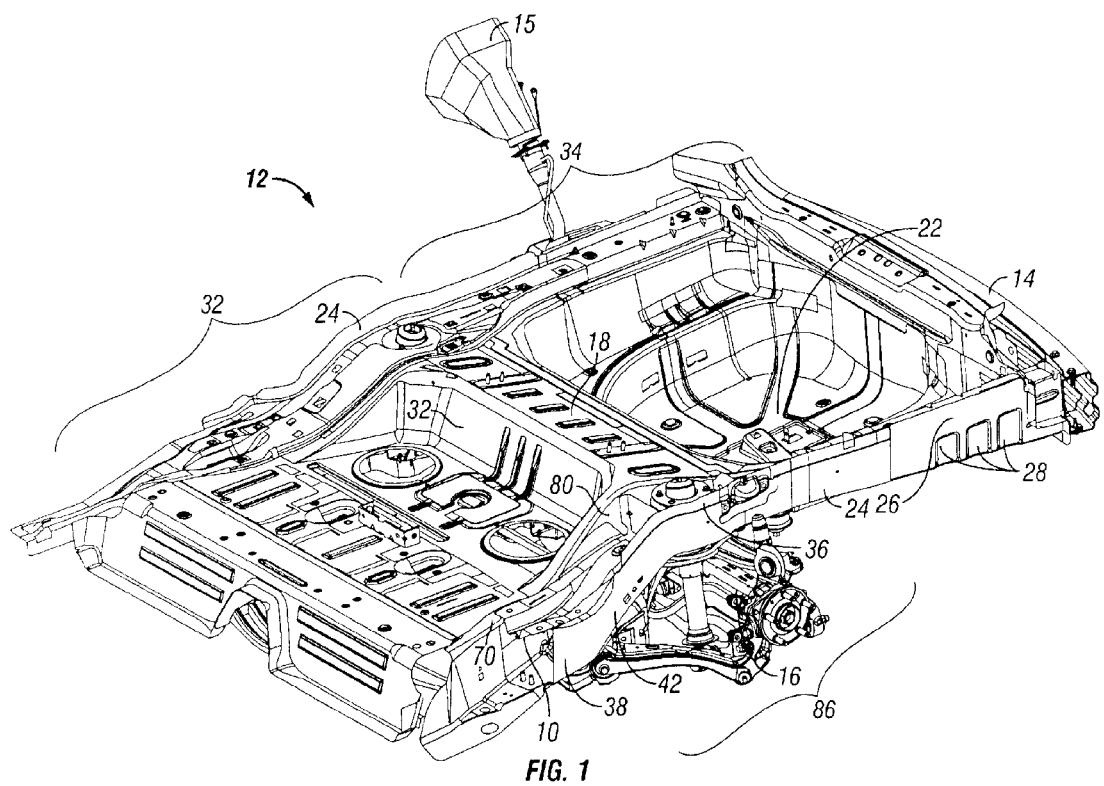
FIG. 1 is a perspective cutout view of a rear body assembly illustrating the rear rail neutralizing member in an installed configuration in one rear rail.

Referring now to the drawings wherein like reference numerals designate corresponding parts throughout the several views, FIGS. 1-7 illustrate components of rear rail neutralizing member (hereinafter designated "neutralizing member") according to the present invention, generally designated 10.

Before providing a description of neutralizing member 10, rear body assembly 12 will first be described in detail to provide a basis for the installation and operation of neutralizing member 10.

Referring to FIG. 1, rear body assembly 12 of a motor vehicle (not shown) may include a rear bumper 14 operatively connected at the rear body assembly 12. The motor vehicle may include a rear suspension system, generally at 16, operatively connected to rear body assembly 12 and a fuel filler housing 15 of a fuel tank (not shown) operatively connected toward a central section 18 of rear body assembly 12. A spare tire tub 22 may be provided generally toward an aft section of rear body assembly 12.

Figure 2:
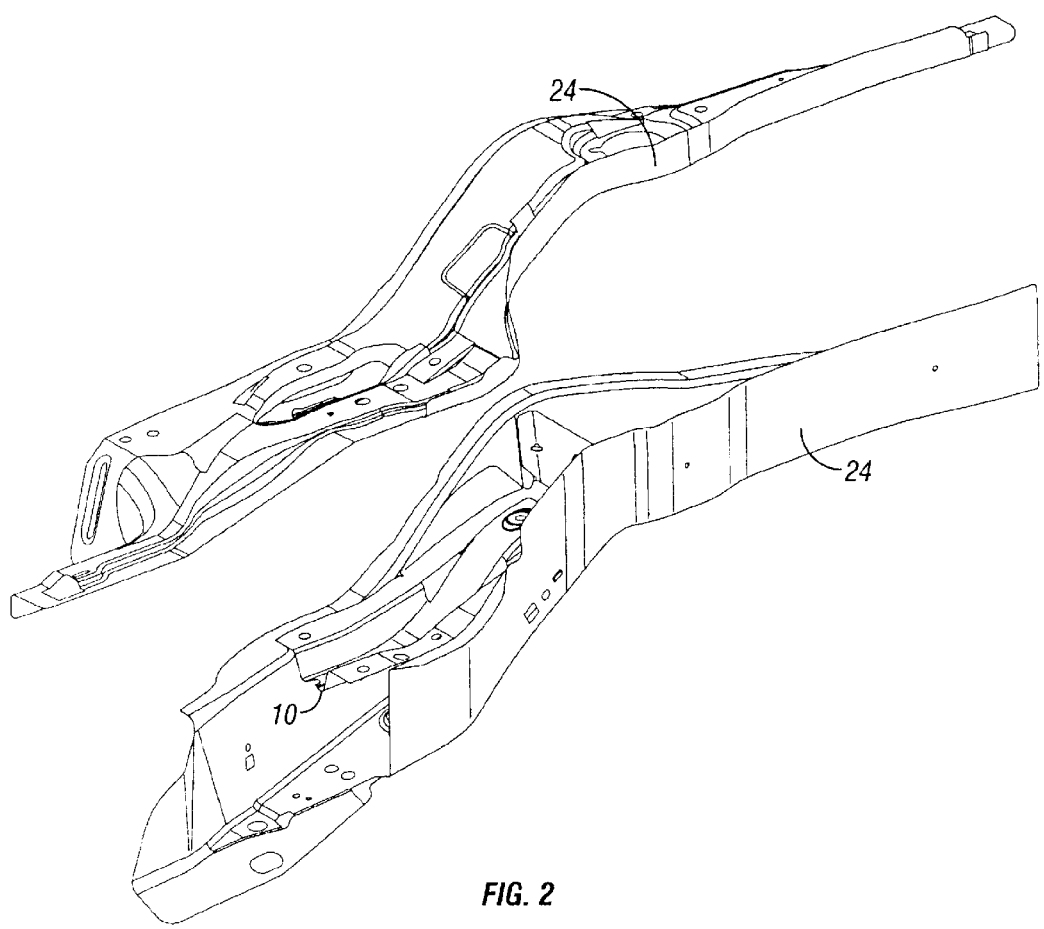
FIG. 2 is an exploded view of the rear rail neutralizing member of FIG. 1, illustrating the neutralizing member installed in one rear rail without the rear body assembly of FIG. 1.
Figure 3:
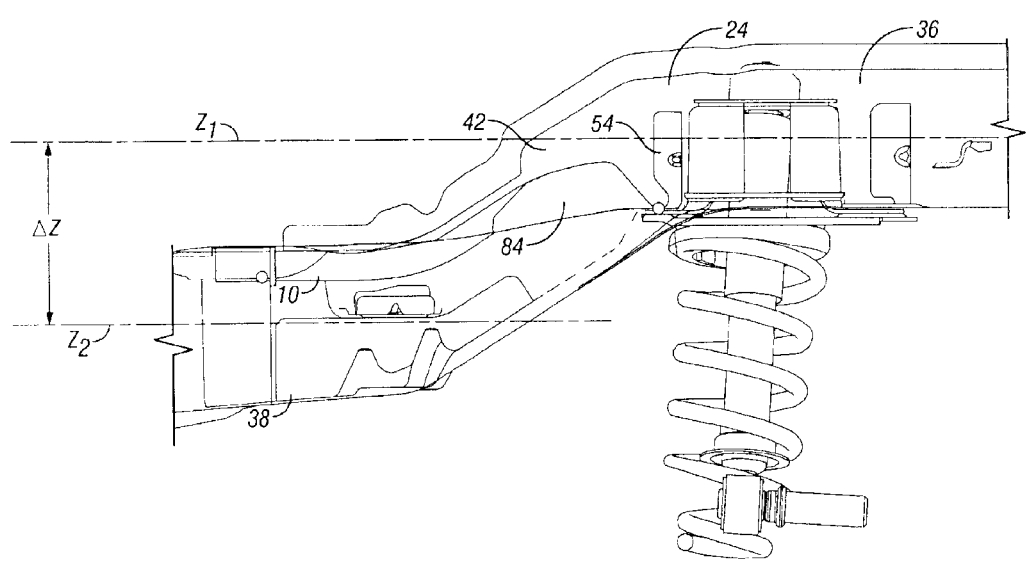
FIG. 3 is a side illustrative view of the rear rail neutralizing member of FIG. 1, illustrating the neutralizing member installed in a rear rail and selective associated components from the rear body assembly of FIG. 1.
Figure 4:
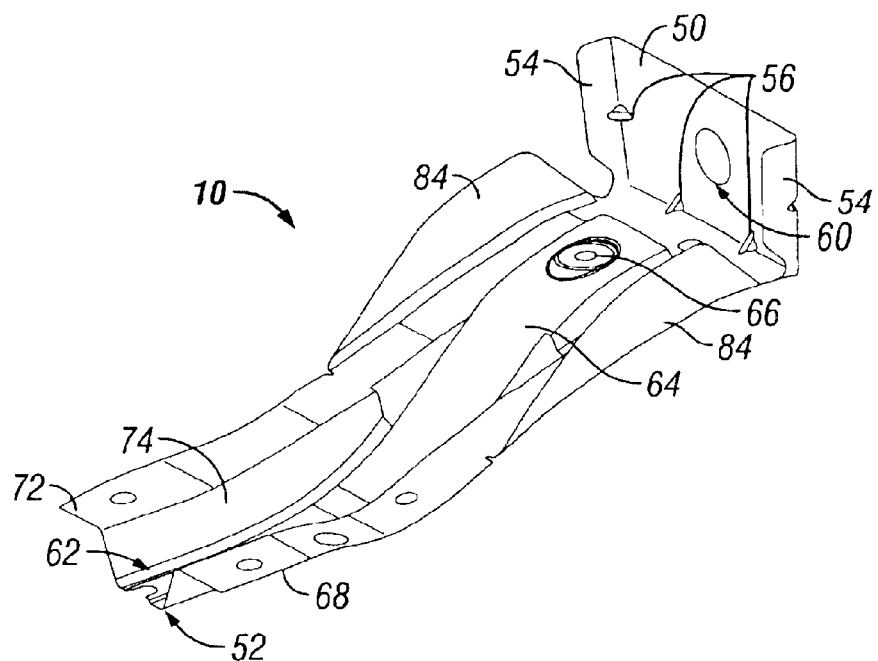
FIG. 4 is an isometric view of the rear rail neutralizing member of FIG. 1.
Figure 5:
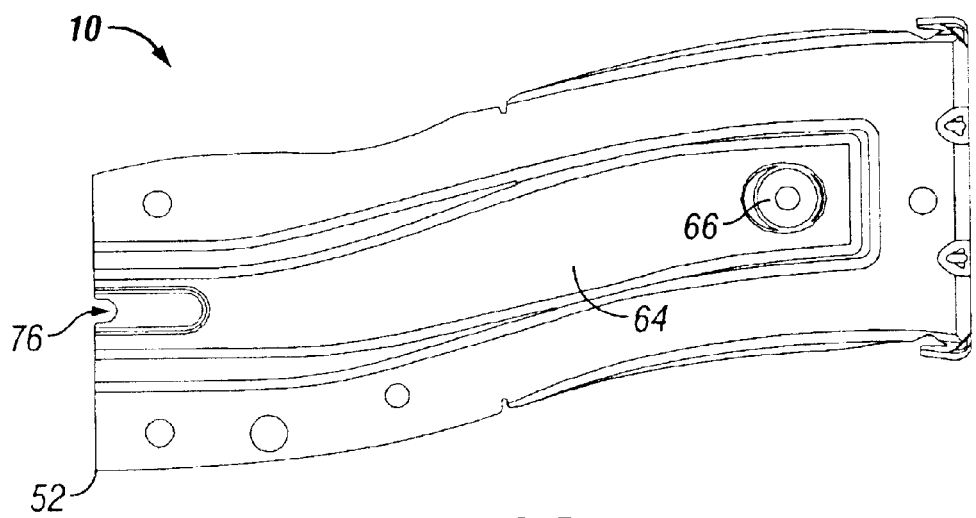
FIG. 5 is a top view of the rear rail neutralizing member of FIG. 1.
Figure 6:
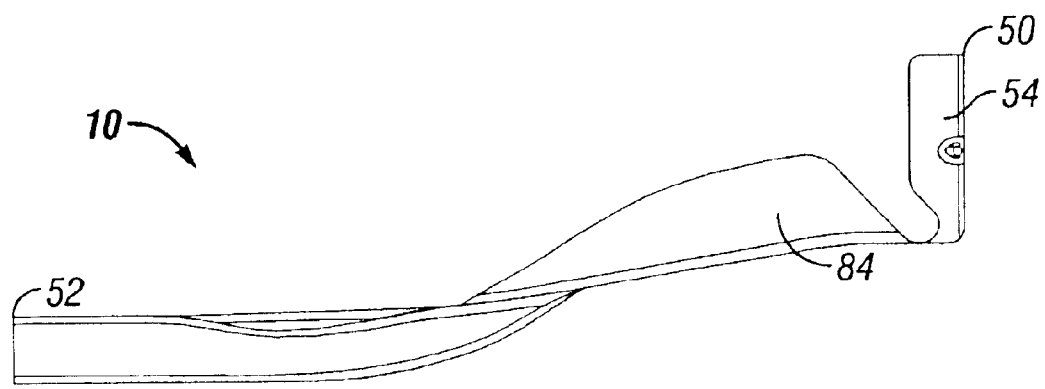
FIG. 6 is a front view of the rear rail neutralizing member of FIG. 5.
Figure 7:
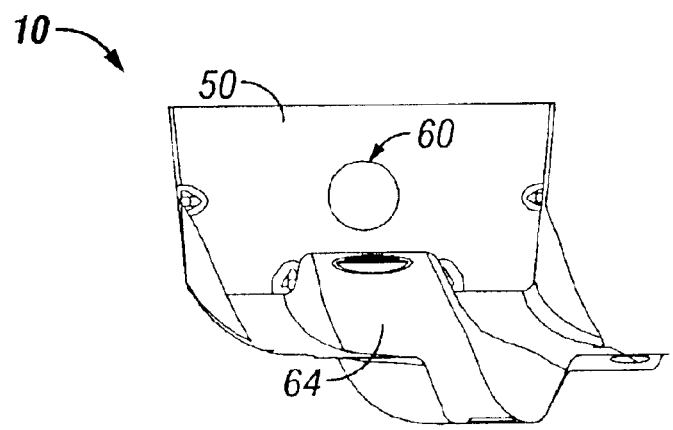
FIG. 7 is a left side view of the rear rail neutralizing member of FIG. 5.

Referring to FIGS. 1-3, rear body assembly 12 may include at least two longitudinally extending rear rails 24 operatively connected thereto. Each rear rail 24 may include rear rail extensions 26 and convolutes 28 for permitting a predetermined "crush" pattern and thus facilitating a predefined distribution of forces generated during a rear impact. A center floor area, generally at 32, may be provided adjacent to the rear floor rear area 34.

Each rear rail 24 may further include a mid-rail section, generally at 36, and a rail to rocker joint section, generally at 38, interconnected by rail waterfall section 42. As illustrated in FIGS. 1-3, neutralizing member 10 may bridge mid-rail section 36 and rail to rocker joint section 38 generally at rail waterfall section 42. As discussed in further detail below, the bridging of mid-rail section 36 and rail to rocker joint section 38 acts to minimize the effect of the moment arm created by the two height levels, represented by $\Delta z$ in FIG. 3, of mid-rail section 36 and rail to rocker joint section 38. In other words, the bridging of mid-rail section 36 and rail to rocker joint section 38 acts to minimize the effect of the centroid differences of rear rail 24 forward and aft of the offset created by the two height levels generally between locations $z1$ and $z2$ of mid-rail section 36 and rail to rocker joint section 38, respectively.

The layout of neutralizing member 10 will now be described in detail.

Referring to FIGS. 1-7, neutralizing member 10 may include first and second generally orthogonal sections 50 and 52, respectively. Those skilled in the art will appreciate in view of this disclosure that sections 50 and 52 may be formed as required for a flush fit within rear rail 24. Thus, first and second sections 50 and 52, respectively, may be disposed transverse to each other, or may include complementary contoured surfaces, as required for a flush fit within rear rail 24.

First section 50 may include two mirror image orthogonal primary flanges 54 for facilitating engagement and retention of section 50 within rear rail 24. Reinforcement knees 56 may be provided as additional reinforcement for retaining first and second sections 50 and 52, and mirror image flanges 54 and first section 50, in a predetermined orientation. A hole 60 may be provided generally at a central location of first section 50 for facilitating alignment and installation of neutralizing member 10 within rear rail 24 and/or for facilitating the manufacture thereof.

Second section 52 may include a generally concave channel 62 disposed generally centrally along a longitudinal partial length thereof. Second section 52 may further include a curved convex member 64 disposed generally centrally along the remaining length thereof and including an alignment hole 66 centrally located therein. Alignment hole 66 may be provided for facilitating alignment and installation of neutralizing member 10 within rear rail 24. Concave channel 62 and convex member 64 may include a curved profile complementary to the internal profile of rear rail 24, as disclosed in FIG. 5. Those skilled in the art will appreciate in view of this disclosure that concave channel 62 and/or convex member 64 may be offset relative to the generally central longitudinal axis of second section 52, as opposed to the configuration illustrated in FIG. 5. Longitudinally extending lateral secondary flanges 68 and 72 may be provided adjacent mirror image walls 74 of concave channel 62. Flanges 68 and 72 may be disposed in a generally horizontal plane for facilitating a flush fit with mating surface 70 of rear rail 24. Those skilled in the art will appreciate in view of this disclosure that flanges 68 and 72 may be disposed generally transverse to walls 74 for facilitating the flush fit thereof with mating surface 70 of rear rail 24. Flange 68 may include notch 76 for facilitating installation and alignment of neutralizing member 10 into rear rail 24. In addition to flanges 68 and 72, mirror image primary flanges 84 may be provided on second section 52, and may be disposed orthogonal relative to flanges 68 and 72 with an inner surface facing an inner surface of the neutralizing member. Those skilled in the art will appreciate in view of this disclosure that flanges 84 may instead be disposed generally transverse to flanges 68 and 72 for facilitating the flush fit thereof with mating surface 80 of rear rail 24.

Neutralizing member 10 may be manufactured by casting or stamping, for example, and may be formed of metals such as aluminum, steel and the like. Moreover, neutralizing member 10 may be formed from a single piece of metal, or alternatively, may be formed of multiple components and welded or otherwise affixed together.

Those skilled in the art will appreciate in view of this disclosure that although only one neutralizing member 10 and associated components have been described and illustrated with regard to FIG. 1, each rear rail 24 may include a neutralizing member 10 and associated components in a mirror-image configuration.

The installation and operation of neutralizing member 10 will now be described in detail.

In order to install neutralizing member 10, an appropriate neutralizing member 10 may first be correctly oriented adjacent rail waterfall section 42 of rear rail 24. Specifically, by utilizing alignment holes, such as holes 60 and/or notch 76, neutralizing member 10 may be appropriately positioned within rear:rail 24. Thereafter, flanges 54 and 84, and flanges 68 and 72 may be welded to adjacent mating surfaces of rear rail 24 to secure neutralizing member 10 to rear rail 24. Those skilled in the art will appreciate in view of this disclosure that instead of or in addition to being welded into rear rail 24, neutralizing member 10 may be affixed into rear rail 24 by screws, bolts and the like.

In operation, upon the occurrence of a rear impact, rear bumper 14 may absorb the initial energy of the rear impact. Thereafter, the unabsorbed impact load may then be transferred through four distinct load compartments that increase gradually toward the forward direction of the vehicle.

Specifically, rail extensions 26 including convolutes 28 of rear rails 24 form the first load compartment and crush axially as the impact path proceeds toward the forward section of rear floor rear area 34. Any unabsorbed impact load may then be transferred to rear rail 24 aft of mid-rail section 36, which forms the second load compartment. Next, each mid-rail section 36 and each rail waterfall section 42, form the third load compartment. Any unabsorbed impact load, within the third load compartment, may be divided into two load paths, one being rear subframe 86 and the other being rear rails 24. Lastly, each rail to rocker joint section 38, forms the fourth load compartment. Any unabsorbed impact load within the fourth load compartment, may be absorbed by rear rails 24 at rail to rocker joint section 38.

This gradual load capacity increase allowed by the structure of rear rail 24 and neutralizing member 10, provides several advantages over conventional rear rail systems which do not include a neutralizing member 10. With regard to rear impact absorption, neutralizing member 10, which bridges mid-rail section 36 and rail to rocker joint section 38 at rail waterfall section 42, acts to minimize the effect of the moment arm created by the two height levels of mid-rail section 36 and rail to rocker joint section 38. Specifically, as illustrated in FIG. 3, the bridging of mid-rail section 36 and rail to rocker joint section 38 acts to minimize the effect of the centroid differences in rear rail 24, forward and aft of the offset created by the two height levels generally between locations z1 and z2 of mid-rail section 36 and rail to rocker joint section 38, respectively.

Rear rails 24 and neutralizing member 10 for the present invention further allow for the sequential collapse of each rear rail 24, which enables gradual and a predefined dissipation of rear impact crash energy. Rear rails 24 and neutralizing member 10 also allow the fuel system (i.e. fuel tank (not shown), fuel filler pipe 15 etc.) to maintain their required integrity during a rear impact.

With regard to vehicles including a third row passenger seat compartment, which is generally located between the longitudinal section defined by the forward portion of rear floor rear area 34 and rail to rocker joint section 38, the seat compartment would also be protected during a rear impact by ensuring that the structure of rear rails 24 is strengthened by neutralizing member 10. Moreover, since the third row passenger seat compartment also includes the back portion of the second row seats (not shown) and third row seats (not shown), the second and third row seats would also be protected during a rear impact by the strengthening of rear rails 24 by neutralizing member 10.

Lastly, with regard to vehicles including pivotable or sliding rear doors (not shown), the strengthening of rear rails 24 by neutralizing member 10 would further enable the continued operation of such doors before and after a rear impact. For example, the strengthening of rear rails 24 by neutralizing member 10 would enable rear doors to remain closed during a rear impact, and further enable rear doors to be opened after a rear impact.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A rear impact absorption system for a motor vehicle, said system comprising:

a rear body assembly including at least one longitudinally extending rear rail including first and second portions having first and second respective heights relative to a generally horizontal plane, said first height being greater than said second height; and a neutralizing member operatively connectable to said rear rail to bridge said first and second heights of said rear rail so as to minimize the effect of a moment arm created by said first and second heights during a rear impact, said neutralizing member further includes first and second sections each respectively including a pair of laterally extending primary flanges disposed generally transverse to said respective first and second sections, each of said primary flanges face an inner surface of said neutralizing member, said second section includes a pair of laterally disposed secondary flanges having said laterally extending primary flanges extending therefrom, and said first section is connected to said second section and disposed generally transverse to said second section at said connection so as to provide a predetermined distribution of impact energy during a rear impact.

2. A system according to claim 1, wherein said pair of laterally extending primary flanges are disposed generally orthogonal to said respective first and second sections, said first section is disposed generally orthogonal to said second section at said connection.

3. A system according to claim 1, said second section including a curved convex member generally centrally disposed along a longitudinal first length of said second section and a curved concave channel generally centrally disposed along a longitudinal second length of said second section, said combined first and second lengths being less than a total length of said second section, said convex member and said concave channel providing a predetermined distribution of impact energy during a rear impact.

4. A system according to claim 3, said curved convex member merging with said curved concave channel.

5. A system according to claim 1, said neutralizing member being made of at least one of aluminum and steel.

6. A neutralizing member operatively connectable to a rear body assembly of a motor vehicle so as to minimize the effect of a moment arm created by first and second heights of respective first and second portions of a rear rail during a rear impact, said neutralizing member comprising:

first and second sections each including a pair of laterally extending primary flanges disposed generally transverse to said respective first and second sections, each of said primary flanges facing an inner surface of said neutralizing member, said first section being connected to said second section and being disposed generally transverse to said second section at said connection so as to provide a predetermined distribution of impact energy during a rear impact, said second section includes a pair of laterally disposed secondary flanges having said laterally extending primary flanges extending therefrom.

7. A neutralizing member according to claim 6, said first section being disposed generally orthogonal to said second section at said connection and said laterally extending primary flanges being disposed generally orthogonal to said respective first and second sections.

8. A neutralizing member according to claim 6, said second section including a curved convex member generally centrally disposed along a longitudinal first length of said second section and a curved concave channel generally centrally disposed along a longitudinal second length of said second section, said combined first and second lengths being less than a total length of said second section, said convex member and said concave channel providing a predetermined distribution of impact energy during a rear impact.

9. A neutralizing member according to claim 8, said curved convex member merging with said curved concave channel.

10. A neutralizing member according to claim 6, said neutralizing member being made of at least one of aluminum and steel.

11. A method for minimizing the effect of a moment arm created by first and second heights of first and second portions of a rear rail during a rear impact on a motor vehicle, said method comprising the steps of:

providing a neutralizing member connectable to the rear rail to bridge the first and second heights of the rear rail, said neutralizing member including first and second sections each including a pair of laterally extending primary flanges disposed generally transverse to said respective first and second sections, each of said primary flanges facing an inner surface of said neutralizing member, said first section being connected to said second section and being disposed generally transverse to said second section at said connection so as to provide a predetermined distribution of impact energy during a rear impact, said second section includes a pair of laterally disposed secondary flanges having said laterally extending primary flanges extending therefrom; and installing said neutralizing member into the rear rail.

12. A method according to claim 11, further comprising the steps of:

providing said first section generally orthogonal relative to said second section at said connection; and providing said laterally extending primary flanges generally orthogonal relative to said respective first and second sections.

13. A method according to claim 11, further comprising the steps of:

providing a curved convex member generally centrally along a longitudinal first length of said second section; and providing a curved concave channel generally centrally along a longitudinal second length of said second section, wherein said combined first and second lengths being less than a total length of said second section, said convex member and said concave channel providing a predetermined distribution of impact energy during a rear impact.

14. A method according to claim 13, said curved convex member merging with said curved concave channel.

15. A method according to claim 11, said neutralizing member being made of at least one of aluminum and steel.

* * * * *